United States Patent [19]

Pritchett

[11] 4,264,746

[45] * Apr. 28, 1981

[54] HYDROLYZED ETHYLENE-VINYL ACETATE RESIN CONTAINING DIENE-NITRILE RESIN AS IMPACT MODIFIER

[75] Inventor: Ervin G. Pritchett, Cincinnati, Ohio

[73] Assignee: National Distillers and Chemical Corp., New York, N.Y.

[*] Notice: The portion of the term of this patent subsequent to Jan. 6, 1998, has been disclaimed.

[21] Appl. No.: 53,158

[22] Filed: Jun. 28, 1979

[51] Int. Cl.³ .............................................. C08L 29/04
[52] U.S. Cl. .......................................... 525/57; 525/60
[58] Field of Search ................ 525/57, 222, 232, 238, 525/240, 60

[56] References Cited

U.S. PATENT DOCUMENTS

| | | |
|---|---|---|
| 3,336,149 | 8/1967 | Fox et al. .................... 260/29.6 TA |
| 3,437,718 | 4/1969 | Rees ...................................... 525/195 |
| 3,549,727 | 12/1970 | Coates et al. ......................... 525/57 |
| 3,585,177 | 6/1971 | Gardner et al. ....................... 525/60 |
| 3,887,649 | 6/1975 | Takida et al. .......................... 525/58 |

FOREIGN PATENT DOCUMENTS

| | | |
|---|---|---|
| 40-8837 | 8/1965 | Japan ......................................... 525/195 |
| 760179 | 10/1956 | United Kingdom ....................... 264/182 |

*Primary Examiner*—J. Ziegler
*Attorney, Agent, or Firm*—Kenneth D. Tremain

[57] ABSTRACT

Permanently miscible resin blends containing hydrolyzed ethylene-vinyl acetate resin and demonstrating improved impact-resistance compared to the unblending hydrolyzed ethylene vinyl acetate resin are obtained by blending (a) as host resin, a copolymer/terpolymer of ethylene, vinyl acetate and vinyl alcohol in which ethylene is present at from about 2 to about 60 weight percent, vinyl acetate is present at from 0 to about 10 weight percent, and vinyl alcohol is present at about 98 to about 40 weight percent, with (b) an impact-resistance-increasing amount of an impact resin which is a diene-nitrile copolymer in which the diene is present at about 50 to about 85 weight percent and the nitrile is present at about 50 to about 15 weight percent, in the presence of (c) an amount of acid compatibilizing agent and for a period sufficient to provide the aforesaid permanently miscible blends.

10 Claims, No Drawings

HYDROLYZED ETHYLENE-VINYL ACETATE RESIN CONTAINING DIENE-NITRILE RESIN AS IMPACT MODIFIER

BACKGROUND OF THE INVENTION

1. Field of the Invention

This invention relates to transparent permanently miscible, i.e., compatibilized, resin blends containing diene-nitrile copolymer as an impact modifying resin for brittle, hydrolyzed ethylene-vinyl acetate (HEVA) resin containing at least about 40 weight percent interpolymerized vinyl alcohol and no more than about 10 weight percent interpolymerized vinyl acetate.

2. Description of the Prior Art

Hydrolyzed ethylene-vinyl acetate resins containing in interpolymerized form from about 2 to about 60 weight percent ethylene, from about 98 to about 40 weight percent vinyl alcohol and no more than about 10 weight percent of vinyl acetate provide moldings which exhibit excellent oil-resistance, stiffness, hardness, tensile strength, flexural strength, compression strength, abrasion resistance and anti-static charge. Unfortunately, however, these resins possess such a low level of impact-resistance that they are for the most part excluded from engineering applications where high impact strength is an indispensable requirement. Thus, for example, brittle, hydrolyzed ethylene-vinyl acetate resins of the foregoing type, due to their poor impact-resistance, are generally unsuitable molding materials for such important commercial applications as electric switch covers, knobs or cabinets, machine parts such as pulleys, rollers, bars, gears, cams or bobbins, and automotive parts subject to dynamic stress loads.

It has been acknowledged by Takida et al. (U.S. Pat. No. 3,887,649) that past attempts to remedy the low impact-resistance deficiency of hydrolyzed ethylene-vinyl acetate resins by incorporating therein a synthetic rubber such as styrene-butadiene copolymer have not met with success. Thus, while Gardiner et al. (U.S. Pat. No. 3,585,177) and Coates et al. (U.S. Pat. No. 3,549,727) propose the use of nitrile rubbers as impact modifiers for brittle, hydrolyzed ethylene-vinyl acetate resin, experience with these modifiers in simple blends of the hydrolyzed resin has been unfavorable due to the tendency of the blends to separate into the component resins and/or develop an unacceptable degree of opacity.

Acid compatibilized blends of nitrile rubbers and saponified or partly saponified ethylene-vinyl acetate copolymers are disclosed and claimed in my copending application Ser. No. 839,234, filed Oct. 4, 1977 allowed and Belgian Pat. No. 844,744.

SUMMARY OF THE INVENTION

It has now been discovered that the impact-resistance of brittle, hydrolyzed ethylene-vinyl acetate copolymers can be dramatically improved by the addition thereto of an impact-resistance increasing amount of a diene-nitrile copolymer and that these resins, which are normally incompatible, can be rendered compatible by effecting their blending in the presence of an acid compatibilizing agent. The resulting resin blends, in addition to possessing improved impact-resistance, retain excellent transparency and processability and as such, can be used in numerous applications for which the unalloyed resins are entirely unsuited, e.g., the production of useful articles by conventional extrusion, compression or transfer molding techniques.

Broadly stated, the permanently miscible resin blends of this invention comprise (a) as host resin, a hydrolyzed ethylene-vinyl acetate copolymer in which ethylene is present at from about 2 to about 60 weight percent, vinyl acetate is present at from 0 to about 10 weight percent and vinyl alcohol is present at about 98 to about 40 weight percent, blended with (b) an impact-resistance-modifying resin which is a diene-nitrile copolymer in which the diene is present at about 50 to about 85 weight percent and the nitrile is present at about 50 to about 15 weight percent, in the presence of (c) an amount of acid compatibilizing agent and for a period sufficient to provide the aforesaid permanently miscible blends.

Unlike simple blends of hydrolyzed ethylene-vinyl acetate resin and diene-nitrile copolymer, the compatibilized blends of the invention herein resist dissolution into the constituent polymers.

DESCRIPTION OF THE PREFERRED EMBODIMENT

The hydrolyzed ethylene-vinyl acetate host resins herein are well known materials and are derived from ethylene-vinyl acetate copolymers by such known and conventional procedures as alcoholysis, saponification or hydrolysis. In a preferred method, ethylene-vinyl acetate is hydrolyzed in the solid phase in the presence of an acidic or alkaline catalyst in a liquid reaction medium incorporating a low-boiling alcohol and, preferably, a hydrocarbon solvent (which acts as a swelling solvent in the reaction medium). The starting ethylene-vinyl acetate copolymer can contain small amounts, e.g., up to about 5 weight percent of a third monomer as, for example, carbon monoxide, sulfur dioxide, methyl acrylate, n-butyl acrylate, hexanediol diacrylate, di-n-butyl maleate, diethyl itaconate, acrylic acid, methacrylic acid, fumaric acid and the like, and can be provided in any convenient solid form, e.g., sheeting, film, pellets, strands, fibers, fine particulate, etc. Since the hydrolyzed host resin is to be subsequently blended with diene-nitrile impact modifying resin, it is desirable that the prehydrolysis form of the host resin be such that it facilitates blending. Powders and pellets are therefore especially advantageous forms of resin.

The low-boiling alcohol which is the reactive component of the liquid alcoholysis reaction medium, can be any monohydric alcohol having up to 4 carbon atoms, i.e., methanol, ethanol, n-propanol, isopropanol, n-butanol, sec-butanol, isobutanol or tert-butanol. The primary alcohols, and especially methanol and ethanol, are preferred.

The hydrocarbon solvent can be a linear paraffin such as ethane, propane, n-butane, n-pentane, n-hexane, n-heptane, n-octane, n-decane, etc.; a branched paraffin hydrocarbon, for example, 2,2-dimethylbutane, 2,2,4-trimethylpentane, or 2,5-dimethylcyclopentane, cyclohexane, cyclooctane, or decahydronaphthalene; or an aromatic hydrocarbon such as benzene, toluene, xylene-isomer, mixtures or the individual isomers thereof, ethylbenzene, cumene, pseudocumene, cymene, diisopropylbenzene, etc. Aromatic hydrocarbons are preferred.

Any of a variety of alkaline or acidic materials can be utilized as catalysts for the alcoholysis reaction. The preferred catalyst is an alkali metal or alkaline earth metal alkoxide of the low-boiling alcohol incorporated in the reaction medium, e.g., lithium methoxide, sodium methoxide, sodium ethoxide, potassium isopropoxide, potassium tert-butoxide, magnesium ethoxide, etc. Alternative catalysts comprise the hydroxides of the alkali metal and alkaline earth metals such as lithium hydroxide, sodium hydroxide, potassium hydroxide, magnesium hydroxide and calcium hydroxide.

The proportion of the ethylene-vinyl acetate copolymer alcoholyzed in the reaction medium can vary from as much as about 10:1 to as little as about 1:1,000 parts by weight of the copolymer: parts by weight of the entire medium. The low-boiling alcohol is present in the reaction medium in an amount at least stoichiometrically equivalent to the number of moles of the vinyl ester repeating units to be alcoholyzed. The prehydrolysis ethylene-vinyl acetate copolymer containing from about 2 to about 60 weight percent ethylene and from about 98 to about 40 percent vinyl acetate is hydrolyzed in the presence of an amount of low-boiling alcohol sufficient to provide a brittle hydrolyzed ethylene-vinyl alcohol resin containing from 0 to about 10 weight percent residual vinyl acetate. The preferred brittle, hydrolyzed ethylene-vinyl alcohol host resins contain from about 5 to about 50 weight percent ethylene, from 0 to less than about 5 weight percent vinyl acetate and from about 95 to about 50 weight percent vinyl alcohol.

The hydrolysis process is carried out at a temperature high enough to favor maximum alcoholysis rates but low enough to prevent substantial dissolution, coalescence, sticking, or agglomeration of the solid forms of the ethylene-vinyl acetate resin being alcoholyzed, in order that the hydrolyzed product is in substantially the same form as the original ethylene-vinyl acetate starting resin. Temperatures of from about 0° to about 150° C., can be utilized. The reaction can be carried out at atmospheric pressure, or alternatively, under applied pressures of up to about 5,000 p.s.i. It is sufficient if the ambient pressure is adequate to maintain the reaction medium in the liquid state at the particular reaction temperature chosen. Reaction times can also be broadly varied; thus, the alcoholysis can be carried out for periods of from about 1 second to about 2 hours, preferably from about 15 seconds to about 15 minutes. The ethylene-vinyl acetate copolymer is introduced into the alcoholysis medium with the temperature, pressure and reaction times regulated as aforesaid. The medium is desirably maintained substantially free of water and the reaction is carried out under a dry, preferably inert atmosphere. To maintain this condition, the reactants are dried prior to introduction into the reaction mixture by passage through a suitable solid desiccant such, for example, as an activated alumina, or silica gel. The drying is conducted under anhydrous conditions, i.e., under a protective atmosphere of a dry, inert gas such as dry nitrogen, argon or helium. When the alcoholysis is completed to the extent desired (principally a function of the quantity of low-boiling alcohol employed), the hydrolyzed ethylene-vinyl acetate resin is removed from the alcoholysis medium. Adhering or absorbed solvent and catalyst residues are conveniently removed by washing with low-boiling alcohol, preferably containing sufficient weak acid to destroy the catalyst. Alternatively or subsequently, further washing can be accomplished with water, and the hydrolyzed product is then dried prior to blending.

The impact modifying diene-nitrile resins herein are a well known type of polymer and are advantageously prepared via well known emulsion polymerization techniques. Thus, the diene and ethylenically unsaturated nitrile can be polymerized in an aqueous system containing polymerization aids, i.e., emulsifiers, modifiers, chelating agents, catalysts and the like.

Suitable dienes for preparing the diene-nitrile copolymers include butadiene-1,3, 2-methyl butadiene-1,3 (isoprene), 2,3-dimethylbutadiene-1,3, piperylene, 2-neopentylbutadiene-1,2 and other hydrocarbon homologs of butadiene-1,2; the substituted dienes such as 2-chlorobutadiene-1,3, 2-cyano butadiene-1,3; the straight chain conjugated pentadienes; the straight chain and branch chain conjugated hexadienes, and the like. In general, dienes containing more than about 10 carbon atoms often polymerize very slowly. Consequently, it is preferred to employ a diene having no more than about 10 carbon atoms, and more preferably, no more than about 5 carbon atoms. Butadiene-1,3 and isoprene are especially advantageous for use herein.

Among the reactive nitriles for use in preparing the impact modifying resins of this invention are included acrylonitrile, alpha-chloro acrylonitrile, methacrylonitrile, ethacrylonitrile, cyanostyrene, cyanobutadiene, methylene glutaronitrile, fumaronitrile, cinnamonitrile, and the like. Acrylonitrile and methacrylonitrile are preferred due to their high level of reactivity and ready availability. If desired, the diene-nitrile copolymer can be prepared with small quantities, e.g., up to about 5 weight percent, of a third monomer such as those recited supra.

Copolymerization of the diene, nitrile and optional third monomer is effected by well known techniques in an aqueous medium containing stable emulsifiers. The proportion of diene to nitrile is such as to provide a copolymer in which the diene is present at about 50 to about 85 weight percent and the nitrile is present at about 50 to about 15 weight percent, and peferably in which the diene is present at about 55 to about 75 weight percent and the nitrile is present at about 45 to about 25 weight percent.

Suitable emulsifiers include alkyl sulfates or sulfonates and alkylaryl sulfonates in which the alkyl groups contain from 10 to 20 carbon atoms, i.e., sodium lauryl sulfate, sodium dodecylbenzene sulfonates, and the like; alkyl and alkylaryl polyether sulfates such as sodium lauryl ether sulfate, sodium benzyl ether sulfate, sodium tridecyl ether sulfate, and the like; phosphated ethoxylated alcohols such as nonyl phenoxy poly(ethyleneoxy) phosphates containing from about 40 to 90 percent by weight of combined ethylene oxide, and the dinonyl phenoxy poly(ethyleneoxy) phosphates containing from about 50 to 70 percent by weight of combined ethylene oxide; and the alkali metal salts of fatty and rosin acids; and the like. In addition, the polymerization system may also include small amounts of stabilizers such as the sodium salt of polymerized alkyl naphthalene sulfonic acid and others known to the art. Usually, the polymerization reactions are promoted by the addition of free radical yielding initiators such as sodium or potassium persulfate, percarbonates, perborates, and the like; organic peroxides such as benzoyl peroxide, acetyl peroxide, di-t-butyl peroxide, and the like; and the organic hydroperoxides such as di-isopropyl benzene hydroperoxide, and the like. Also redox systems of polymerization initiation may be employed in which the above-mentioned initiators are utilized with suitable reducing agents well known in the art.

Small amounts of compounds containing sulfhydryl groups may also be employed. Exemplary of the modifiers are the alkyl mercaptans containing 10 to 22 carbon atoms, such as n-dodecyl mercaptan, the commercially available mixtures of tertiary mercaptans containing 12 to 16 carbon atoms, such as t-dodecyl mercaptan and the like, thiophenol, and the like. It will be understood that a wide range of temperature may be used to effect polymerization of the monomeric mixtures; i.e., from about 5° C. to 80° C. and that such polymerization methods result in the formation of diene-nitrile copolymer in the form of a latex, aqueous dispersion and suspension of small drops or globules from which the copolymer can be recovered employing conventional procedures.

Compatibilization of the hydrolyzed ethylene vinyl acetate host resin with the diene-nitrile impact modifying resin is achieved by blending the resins in the presence of a minor amount of a compatibilizing acid, infra. Preferably, the component resins are melt blended together with the acid in a suitable mill or extruder. For example, the resins are intimately mixed, the acid is injected and mixing is continued until reaction is complete. Alternatively, the acid can be pre-mixed with one of the component resins and any other components then added to this pre-mix, mixing of the whole being continued until the desired reaction is realized. Those familiar with the art will discern various ways in which the resins involved can be brought together to accomplish the purpose of this invention, and the process of this invention is not to be limited to any particular mode of combination of materials. However, it is preferred for simplicity to inject an aqueous solution of the acid in an amount just sufficient to induce the desired compatibilization into a melt blend of the component materials and to shear blend the mixture until suitable compatibilization is complete. Also, if desired, one or both resin components can be used in the form of a solution thereof in an inert solvent. As used herein, the term "compatibilization" means the conversion of a mixture of at least two components into a grossly homogeneous, permanently miscible composition which has useful properties not evident in a simple blend of the components, and which does not separate spontaneously into its component parts.

It is believed that the compatibilizations realized in the practice of this invention result from a type of cross-linking between the components as a result of inter-condensation reactions involving nitrile groups of the impact modifying resin with hydroxyl groups of the host resin, the acid acting as a condensation agent. Such condensation reactions are known in simple monomolecular chemistry. It is surprising, however, that polymer reactions of such nature are possible at rapid rates, and yield novel and useful compositions without an extreme loss of thermoplasticity through cross-linking. It is also surprising on the basis of prior chemical art that acids having pKa values of more than about 1 may serve as condensation agents for components containing nitrile functionality with those containing hydroxyl functionality. In addition to, and despite, the chemistry suggested above, it is to be noted that other, obscure factors are involved in the process of the present invention. For example, oxygen is found to be beneficial to rapid reaction rates, a factor not clearly applicable to acid induced condensation. Similarly, melt viscosity increase versus time plots for the alloying of certain thermoplastics via the process of the invention are non-linear suggesting phase changes occur which are not predictable on the basis of the chemistry thought to be involved.

Either a strong or a weak acid can be used as the acid compatibilization agent herein. The acid compatibilization agent is a proton donor acid having pKa in water less than about 4 and preferably less than about 3. Examples include aryl sulfonic acids such as benzene sulfonic acid, toluene sulfonic acids, naphthalene sulfonic acid, 2,7-naphthalene disulfonic acid, dodecyl benzene sulfonic acid and the like; alkyl esters of sulfuric acid such as lauryl sulfuric acid and the like; carboxylic acids such as oxalic, trichloracetic, 2-methyl-6-nitrobenzoic and the like; other organic acids such as picric acid, citric acid, salicylic acid, d-tartaric acid, mandelic acid, and the like; as well an inorganic acids, e.g., mineral acids, such as perchloric, sulfuric, hydrochloric, phosphorous, bisulfate ion acids (e.g., $NaHSO_4$, $KHSO_4$ and $NH_4HSO_4$) and the like. If the acid to be employed has more than one dissociable hydrogen, the acid is included in the context of this invention if the pKa in water for at least one of the hydrogens is less than about 4. It is preferred that the acid component be relatively stable and reasonably nonvolatile at about 150°–220° C. to reduce losses during processing. Weak acids having pKa between about 3 and about 1 are preferred if it is desirable to avoid hydrolysis of any ester groups remaining in the hydrolyzed ethylene-vinyl acetate host resin.

A weak acid compatibilizing agent is a proton donor acid having a pKa in water (of one or more dissociable hydrogens) greater than about 1 and less than about 4. Preferably, the pKa is about 1 to 3. Typical examples include maleic, sulfamic, citric, nitrobenzoic, chloracetic and like acids. A strong acid compatibilizing agent is a proton donor acid having pKa in water less than about 1; typical examples include sulfuric, aryl sulfonic, picric and perchloric acids.

The diene-nitrile impact modifying resin is added to the hydrolyzed ethylene-vinyl acetate host resin at a level which is sufficient to provide a significant increase in impact-resistance of the blend over the host resin alone and is generally proportionate to the amount of vinyl alcohol groups present in the latter. In general, the addition of from about 5 to about 30 weight percent of impact modifying resin by weight of host resin is sufficient to provide an appreciable increase in impact resistance of the blend compared to that of the host resin alone.

The acid compatibilization agent herein comprises only about 0.001% to about 8% of the total composition, preferably about 0.1% to about 5%. It is important in this respect to avoid the presence of bases such as basic nitrogen containing monomer except in small quantities which may be readily neutralized by the addition of excess acid compatibilization agent. Subject to this proviso, conventional additives such as pigments, fillers, plasticizers, stabilizers, lubricants, etc., can be incorporated at any time during the compatibilization process.

Blending of the resins in accordance with this invention is effected at a temperature sufficient to allow ready mixing of the resins, but not so high as to result in their excessive decomposition or degradation; that is, generally in the temperature range of about 100° to about 300° C., preferably about 100° to about 225° C. Blending of the resins is continued until compatibilization has been realized. Usually the mixing time ranges from about 2 to about 60 minutes, preferably about 10 to about 40 minutes, although longer or shorter times can be used if desired. The pressure employed is not critical and is preferably ambient. It is usually convenient to effect mixing under an inert atmosphere such as nitrogen, argon, and the like, to avoid extraneous influences on the process (e.g., oxygen leads to variable reaction rates); but the inert atmosphere is not essential, particularly when suitable antioxidants are added.

In the examples which follow, Examples 1 and 5(A) illustrate the poor impact-resistance of hydrolyzed ethylene-vinyl acetate (HEVA) resin alone and Examples 2 and 5(B) demonstrate the incompatibility of HEVA with diene-nitrile copolymer even though impact-resistance of the blend is dramatically increased. Examples 3, 4 and 5(C) demonstrate the marked improvement in compatibility of impact-resistance modified HEVA resin when blending of the host and impact modifying resins takes place in the presence of an acid compatibilizing agent.

EXAMPLE 1

Compression molded discs 1-¾ inches in diameter by 60 mils thick were formed from a hydrolyzed ethylene-vinyl acetate copolymer (HEVA) representing a 30:70 EVA copolymer saponified to 2.4 percent residual vinyl acetate (96.6 percent hydrolysis). The molded discs were conditioned according to Procedure A of ASTM D-618 and impact tested with a Gardner Laboratories IG-1120M Falling Weight Impact Tester. Impact strength of the HEVA was found to be 0.3 in. lb./mil with brittle break.

EXAMPLE 2

In the roller blade equipped mixing head of a C. W. Brabender Plastograph (160° C. jacket temperature, nitrogen blanketed) there were blended for 10 minutes at 60 rpm 32 parts of the HEVA of Example 1, 0.1 part of a 1:4 mixture of powdered sulfur with 2246 antioxidant (American Cyanamid Company) and 8 parts of HYCAR 1452-P-50 nitrile rubber (B. F. Goodrich Chemical Company), a 67:33 copolymer of butadiene and acrylonitrile. Tested as in Example 1, the product blend evidenced impact strength 0.8 in. lb./mil, a 166 percent increase over that for unmodified HEVA. The blend moldings were hazy-translucent.

EXAMPLE 3

The experiment of Example 2 was repeated except that one milliliter of 1.5 normal ammonium bisulfate solution was added. In contrast to Example 2 wherein blending was accomplished with a slight decrease in torque (melt viscosity), a strong torque increase was initiated by the bisulfate addition. After 30 minutes mixing (161° C. to 172° C.), the product was removed and compression molded to give very clear pieces. Tested as in Example 1, the polyalloyed blend had impact strength 3.2 in. lb./mil, a 970 percent increase over that for HEVA only and a 300 percent increase over that for the simple blend of Example 2.

EXAMPLE 4

The experiment of Example 3 was repeated except that the HEVA was increased from 32 to 45 parts and the nitrile rubber was decreased from 8 to 5 parts. The product polyalloy furnished clear moldings having impact strength 1.25 in. lb./mil with ductile rupture at failure.

EXAMPLE 5

(A) An ethylene-vinyl acetate copolymer of 68.6 percent vinyl acetate content and melt flow rate 58 g/10 min. under Condition B, ASTM D-2138, was saponified to an HEVA 3.32 percent vinyl acetate (95 percent hydrolysis) and melt flow rate 9.9 g/10 min. Gardner impact resistance was only 0.4 in. lb./mil for compression molded discs, failure being of brittle type.

(B) A blend of 36 parts of this brittle HEVA with 9 parts of HYCAR 1452P-50 nitrile rubber had Gardner impact resistance 2.0 in. lb./mil and gave fairly clear moldings which, however, exhibited a high degree of "blush" (transparency loss) upon being bent or struck.

(C) When the simple blend of HEVA-HYCAR was treated in the Plastograph mixer with 1.2 part of 1.5 normal p-toluene sulfonic acid and mixed for 30 minutes at 60-30 rpm and 170°-195° C., a compatibilized blend (polyalloy) resulted which had Gardner impact resistance 3.1 in. lb./mil with ductile failure and exhibited no blush upon being bent or struck.

EXAMPLE 6

A hydrolyzed 14.8:85.2 ethylene-vinyl acetate copolymer had 27.7 percent hydroxyl and 0.71 percent residual vinyl acetate by analysis, together with a melt flow rate of 1.97 under condition E. The hydrolyzed copolymer, plasticized with 1.1 parts per hundred of glycerol, molded readily to 10 mil sheets which, however, were cloudy-translucent and very brittle.

When the hydrolyzed copolymer was coreacted with 25 parts per hundred of HYCAR 1494-80-P (a 79:21 diene-nitrile copolymer rubber produced by B. F. Goodrich Co.) and 1.3 percent on total composition of ammonium bisulfate with 25 minutes blending as in Example 3, a composition resulted which could be molded to very clear transparent pieces. 10 mil film pressed from the compatibilized blend evidenced no blush upon creasing, an indication of excellent compatibilization.

What is claimed is:

1. A resin blend solid at ambient temperature demonstrating improved impact-resistance comprising (a) as host resin, a hydrolyzed ethylene-vinyl acetate copolymer in which ethylene is present at from about 2 to about 60 weight percent, vinyl acetate is present at from 0 to about 10 weight percent and vinyl alcohol is present at about 98 to about 40 weight percent, blended with (b) an impact-resistance modifying amount of an impact modifying resin which is a diene-nitrile copolymer in which the diene is present at about 50 to about 85 weight percent and the nitrile is present at about 50 to about 15 weight percent, in the presence of (c) from about 0.001 to 8 percent by weight of the blend of copolymers (a) and (b) of an acid compatibilizing agent and for a period sufficient to provide the aforesaid permanently miscible blends.

2. The resin blend of claim 1 in which the host resin (a) contains from about 5 to about 50 weight percent ethylene, from 0 to less than about 5 weight percent vinyl acetate and from above about 95 to about 50 weight percent vinyl alcohol.

3. The resin blend of claim 1 in which the diene component of the impact modifying resin (b) is butadiene-1,3 or isoprene.

4. The resin blend of claim 1 in which the nitrile component of the impact modifying resin (b) is acrylonitrile or methacrylonitrile.

5. The resin blend of claim 1 in which the impact modifying resin (b) contains from about 55 to about 75 weight percent diene and from about 45 to about 25 weight percent nitrile.

6. The resin blend of claim 1 in which the acid compatibilizing agent (c) is a strong acid having a pKa in water of less than about 1.

7. The resin blend of claim 6 in which the acid compatibilizing agent (c) is aryl sulfonic acid, an alkyl ester of sulfuric acid, picric acid or a mineral acid.

8. The resin blend of claim 6 in which the acid compatibilizing agent (c) is an aryl sulfonic acid.

9. The resin blend of claim 1 in which the acid compatibilizing agent (c) is a weak acid having a pKa in water of less than about 4 and greater than about 1.

10. The resin blend of claim 9 in which the acid compatibilizing agent (c) is a bisulfate ion acid.

* * * * *